US008478893B2

(12) United States Patent
Hiie

(10) Patent No.: US 8,478,893 B2
(45) Date of Patent: Jul. 2, 2013

(54) DATA TRANSMISSION TO OFFLINE RECIPIENT NODES IN A DISTRIBUTED NETWORK

(75) Inventor: Magnus Hiie, Tallinn (EE)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 12/660,082

(22) Filed: Feb. 19, 2010

(65) Prior Publication Data

US 2010/0262714 A1 Oct. 14, 2010

(30) Foreign Application Priority Data

Apr. 14, 2009 (GB) .................................. 0906414.8

(51) Int. Cl.
*G06F 15/16* (2006.01)

(52) U.S. Cl.
USPC .......................................................... 709/234

(58) Field of Classification Search
USPC .......................................................... 709/234
See application file for complete search history.

(56) References Cited

U.S. PATENT DOCUMENTS 6,393,466 B1 * 5/2002 Hickman et al. .............. 709/214
7,111,006 B2 * 9/2006 Vange et al. .......................... 1/1
7,113,998 B1 9/2006 Stern et al.
7,289,453 B2 10/2007 Riedel et al.
7,593,376 B2 9/2009 D'Amico et al.
7,702,923 B2 * 4/2010 Weik et al. .................... 713/193
8,204,955 B2 * 6/2012 McBride et al. .............. 709/217
8,363,661 B2 1/2013 Hiie et al.
2002/0004796 A1 * 1/2002 Vange et al. .................... 707/10
2002/0194108 A1 12/2002 Kitze
2003/0112766 A1 6/2003 Riedel et al.
2003/0158958 A1 8/2003 Chiu
2005/0240591 A1 10/2005 Marceau et al.

(Continued)

FOREIGN PATENT DOCUMENTS

GB 2 440 762 A 2/2008
GB 2440762 2/2008

(Continued)

OTHER PUBLICATIONS

Guo, Y-H., "Trickle: Resilient Real-Time Video Multicasting for Dynamic Peers with Limited or Asymmetric Network Connectivity," IEEE Eighth International Symposium on Multimedia, pp. 391-398 (2006).

(Continued)

*Primary Examiner* — Brian P Whipple
(74) *Attorney, Agent, or Firm* — Wolfe-SBMC

(57) ABSTRACT

The present invention provides a method of transmitting data in a network of interconnectable end-user nodes comprising a source node, a recipient node and a plurality of further nodes, wherein each of the end-user nodes is executing an instance of a communication client application. The invention also provides corresponding method of receiving data, and corresponding computer programs and user terminals. The method of transmitting data comprises: comprising: the communication client of the source node receiving a command to transmit the data to the recipient node; the source node selecting from the plurality of further nodes at least one storage node to store the data from the source node before being retrieved by the recipient node; transmitting the data from the source node to the at least one storage node; and the source node providing a network identity for each of the at least one storage nodes to the recipient node.

21 Claims, 5 Drawing Sheets

U.S. PATENT DOCUMENTS

| | | | | |
|---|---|---|---|---|
| 2006/0140123 | A1 | 6/2006 | Conner et al. | |
| 2007/0127421 | A1 | 6/2007 | D'Amico et al. | |
| 2007/0280172 | A1 | 12/2007 | Tan et al. | |
| 2009/0125582 | A1 | 5/2009 | Marcus | |
| 2009/0307760 | A1* | 12/2009 | Yoshimura | 726/4 |
| 2010/0011435 | A1* | 1/2010 | Wee et al. | 726/15 |
| 2010/0153496 | A1 | 6/2010 | Heinla | |
| 2010/0182916 | A1 | 7/2010 | Drewes et al. | |
| 2010/0227620 | A1 | 9/2010 | Naden et al. | |
| 2010/0260190 | A1 | 10/2010 | Hiie et al. | |
| 2010/0262714 | A1 | 10/2010 | Hiie | |

FOREIGN PATENT DOCUMENTS

| | | | |
|---|---|---|---|
| GB | 2 444 339 | A | 6/2008 |
| GB | 2444339 | | 6/2008 |
| WO | WO 03/046736 | A1 | 6/2003 |
| WO | WO-03046736 | | 6/2003 |
| WO | WO 2005/009019 | A2 | 1/2005 |
| WO | WO-2005009019 | | 1/2005 |
| WO | WO 2005/046148 | A1 | 5/2005 |
| WO | WO-2005046148 | | 5/2005 |
| WO | WO-2010119026 | | 10/2010 |

OTHER PUBLICATIONS

Search Report issued in Great Britain Application No. GB0906413.0, dated Jul. 14, 2009 (1 page).

Notification of Transmittal of the International Search Report and the Written Opinion of the International Searching Authority, or the Declaration for International Application No. PCT/EP2010/054805, dated Oct. 5, 2010, 13 pp.

"Non Final Office Action", U.S. Appl. No. 12/660,062, (Jan. 5, 2012), 19 pages.

"Non-Final Office Action", U.S. Appl. No. 12/660,062, (Jun. 6, 2012), 18 pages.

"Search Report under Section 17", Application No. 0906413.0, (Jul. 14, 2009), 1 page.

Guo, Yu-Hsuang et al., "Trickle: Resilient Real-Time Video Multicasting for Dynamic Peers with Limited or Asymmetric Network Connectivity", *IEEE Eighth International Symposium on Multimedia*, (2006), 8 pages.

Search Report issued in Great Britain Application No. GB0906414.8, dated Aug. 3, 2009 (1 page).

"Notice of Allowance", U.S. Appl. No. 12/660,062, (Sep. 25, 2012), 12 pages.

* cited by examiner

DATA TRANSMISSION TO OFFLINE RECIPIENT NODES IN A DISTRIBUTED NETWORK

RELATED APPLICATIONS

This application claims priority under 35 U.S.C. §119 or 365 to GB Application No. 0906414.8 filed 14 Apr. 2009.

The entire teachings of the above application are incorporated herein by reference.

FIELD OF THE INVENTION

This invention relates to transmitting and receiving data.

BACKGROUND

Packet-based communication systems allow a user of a device, such as a personal computer, to communicate across a computer network such as the internet. Packet-based communication systems provide features to the user such as voice over internet protocol ("VoIP") calling, video calling, file transfer, instant messaging ("IM"), and voicemail. These systems are beneficial to the user as they are often of significantly lower cost than fixed line or mobile networks. This may particularly be the case for long-distance communication. To use a packet-based communication system, the user must install and execute communication client software on their user terminal. The communication client software enables the connections between users as well as other functions such as registration and authentication.

One type of packet-based communication system uses a peer-to-peer ("P2P") overlay network topology operating on the internet. To enable access to a peer-to-peer system, the user must execute P2P client software provided by a P2P software provider on their user terminal, and register with the P2P system. When the user registers with the P2P system the client software is provided with a digital certificate from a server. Once the client software has been provided with the certificate, communication can subsequently be set-up and routed between user terminals of the P2P system without the further use of a server. The network address of a destination user terminal can be found by the client software accessing a P2P database distributed across other user terminals of the P2P system. Once the network address of the destination user terminal is known, the calling user terminal can exchange of one or more digital certificates with the destination user terminal. The exchange of the digital certificates between the user terminals provides proof of the users' identities and that they are suitably authorised and authenticated in the P2P system. Therefore, the presentation of digital certificates provides trust in the identity of the user. It is therefore a characteristic of peer-to-peer communication that the communication can be established and proceeds without using a server, by operating from end-user terminal to end-user terminal with support provided by other end-user terminals of the P2P system. Further details on such a P2P system are disclosed in WO 2005/009019.

File transfer functionality is provided by the packet-based communication system, and is utilised by users to share data files such as, for example, pictures, documents, audio files or movie clips. File transfers using the packet-based communication system are advantageous to the user compared to traditional methods for sending files such as email as there are not strict limits on the size of the files that can be sent, and the sender can readily track the progress of the transmission to determine if it has been received at the recipient. Furthermore, it is much easier and faster to set-up a file transfer using the packet-based communication system compared to other, dedicated file transfer methods such as ftp.

A problem with the file transfer functionality provided in packet-based communication systems is that both the sender and recipient of the data file need to be connected to the packet-based communication system (i.e. online) at the same time in order to exchange the file. This is in contrast to a service such as email, in which a file can be sent to a recipient regardless of whether the recipient is currently online. This can be problematic as the sender must wait for the recipient to be online before sending the file, and both parties must stay online until the transfer is completed. This reduces the utility of the file transfer functionality, and there is therefore a need for a technique to address the aforementioned problem with file transfer over the packet-based communication system.

SUMMARY

According to one aspect of the present invention there is provided a method of transmitting data in a network of interconnectable end-user nodes comprising a source node, a recipient node and a plurality of further nodes, wherein each of the end-user nodes is executing an instance of a communication client application, the method comprising: the communication client application of the source node receiving a command to transmit the data to the recipient node; the source node selecting from the plurality of further nodes at least one storage node to store the data from the source node before being retrieved by the recipient node; transmitting the data from the source node to the at least one storage node; and the source node providing a network identity for each of the at least one storage nodes to the recipient node.

Because the data is stored on at least one storage node, the recipient node does not need to be online at the same time as the source node for the data to be transmitted from the source node. Similarly, the source node does not need to be online at the same time as the recipient node in order for the recipient node to receive the data from the at least one storage node. The transmission of the notification message to the recipient node alerts the recipient node to the presence of a data file awaiting it, and the data identifier enables it to locate where the data file is stored using the database.

Because the at least one storage node is an end-user node (selected from the further nodes), a central server is not required to store the data sent from the source nodes. Therefore, additional network infrastructure with a large storage and bandwidth capacity is not required, reliability is increased and costs are reduced.

In embodiments, the at least one storage node may not read the content of the data.

Furthermore, the recipient node and the plurality of further nodes may be mutually exclusive.

Because the storage nodes preferably do not read the content of the data, and are not recipient nodes, they act as non-participant "helper" nodes to enable the delivery of the data stream to the recipient nodes.

In embodiments, the method may further comprise the step of the source node encrypting the data using an encryption key prior to transmitting the data to the at least one storage node.

The method may further comprise the step of transmitting a notification message comprising a data identifier from the source node to the recipient node.

Because the data is preferably encrypted by the source node before it is sent to the at least one storage node, the at least one storage node is not able to read the data that it is storing. This maintains the privacy of the sender and recipient. The encryption key is needed to decrypt the data, and this is not provided to the storage nodes, but is instead sent separately to the recipient node in the notification message.

In embodiments, the notification message may further comprise the encryption key.

The method may further comprise the step of deriving a further identity for the data from the data identifier.

The method may further comprise providing the further identity for the data to the recipient node in association with the network identity.

The further identity may be generated by the source node using a function having the data identifier as a first input.

The function may further have the encryption key as a second input.

The function may be a one-way function, such that the data identifier cannot be derived from the further identity.

Because a further identity is preferably used in the database, the actual data identifier is hidden from the storage nodes and any other nodes that are able to access the database. This prevents any nodes other than the source node and the recipient node knowing what the original data identifier is. This protects the privacy of the source and recipient nodes.

The one-way function may be a hash function.

The step of providing a network identity for each of the at least one storage nodes to the recipient node may comprise storing the network identity for each of the at least one storage nodes in a database that is accessible by the recipient node.

The step of selecting may comprise: determining available resources at the plurality of further nodes and selecting the at least one storage node in dependence on the available resources.

By splitting the data up into portions, no single storage node has possession of the complete data. This increases the security and privacy of the data transmission.

The method may further comprise the step of, in the case that the source node selects a plurality of storage nodes, generating a plurality of data blocks from the data, and the step of transmitting the data may comprise transmitting at least one block of the data to each of the plurality of storage nodes.

The method may further comprise the step of providing to the recipient node an indication of which block of the data each of the plurality of storage nodes has stored.

The method may further comprise the step of the source node storing a network identity for the source node in the database.

The network of interconnectable end-user nodes may be an overlay network operating on the internet. The overlay network may be a peer-to-peer overlay network.

According to another aspect of the present invention there is provided a method of receiving data in a network of interconnectable end-user nodes comprising a source node, a recipient node and a plurality of further nodes, wherein each of the end-user nodes is executing an instance of a communication client application, the method comprising: the communication client application of the recipient node determining that data from the source node is awaiting retrieval; the recipient node deriving at least one network identity for at least one further node acting as a storage node for the data; and the recipient node determining whether the data can be retrieved from the at least one storage node, establishing a connection with one or more of the at least one storage nodes and retrieving the data.

Because the recipient node is alerted to the presence of data awaiting retrieval, and the recipient node is provided with sufficient information to enable it to locate this data, the recipient node can retrieve the data without the source node being online at the same time. Because the at least one storage node is an end-user node (selected from the further nodes), a central server is not required to store the data being retrieved by the recipient node. Therefore, additional network infrastructure is not required, reliability is increased and costs are reduced.

According to another aspect of the present invention, there is provided a computer programme product comprising programme code means which, when executed by a computer, implement the method according to any of the above methods.

According to another aspect of the present invention, there is a provided user terminal connected to a network of interconnectable end-user nodes comprising a recipient node and a plurality of further nodes, wherein the user terminal and each of the end-user nodes is arranged to execute an instance of a communication client application; and the communication client application of the user terminal is configured to receive a command to transmit the data to the recipient node; select from the plurality of further nodes at least one storage node to store the data from the source node before being retrieved by the recipient node; transmit the data from the source node to the at least one storage node; and provide a network identity for each of the at least one storage nodes to the recipient node.

According to another aspect of the invention, there is provided a user terminal connected to a network of interconnectable end-user nodes comprising a source node and a plurality of further nodes, wherein the user terminal and each of the end-user nodes is arranged to execute an instance of a communication client application, and the communication client of the user terminal is configured to determine that data from the source node is awaiting retrieval; derive at least one network identity for at least one further node acting as a storage node for the data; determine whether the data can be retrieved from the at least one storage node; establish a connection with one or more of the at least one storage nodes and retrieve the data.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
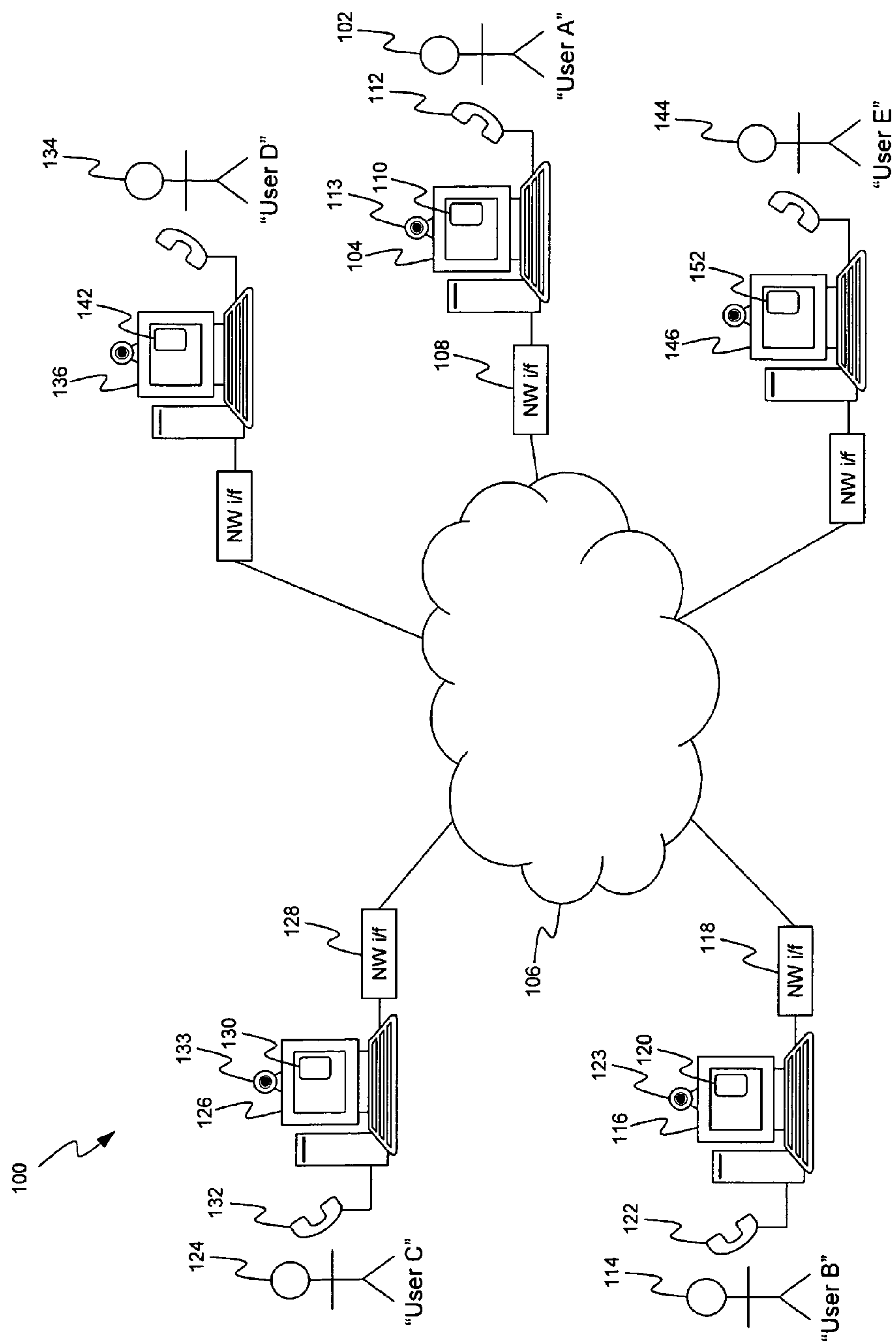
FIG. 1 shows a packet-based communication system.

Reference is first made to FIG. 1, which illustrates a packet-based communication system 100. Note that whilst this illustrative embodiment is described with reference to a P2P overlay network, other types of communication system could also be used, such as non-P2P, VoIP, IM or file transfer systems. A first user 102 of the communication system (named "User A") operates a user terminal 104 which is able to connect to a network 106 such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user terminal 104 is arranged to receive information from and output information to the user 102 of the device. Preferably, the user device comprises a display such as a screen and an input device such as a keyboard, mouse, joystick and/or touch-screen. The user device 104 is connected to the network 106 via a network interface 108 such as a modem, and the connection between the user terminal 104 and the network interface 108 can be via a cable (wired) connection or a wireless connection. Note that in alternative embodiments, the user terminal 104 can connect to the communication network 106 via additional intermediate networks not shown in FIG. 1.

The user terminal 104 is running a communication client 110, provided by the packed-based communication system software provider. The communication client 110 is an application layer software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself. The user terminal 104 is further connected to a webcam 113 for providing video data, for example for use in video calls.

Figure 2:
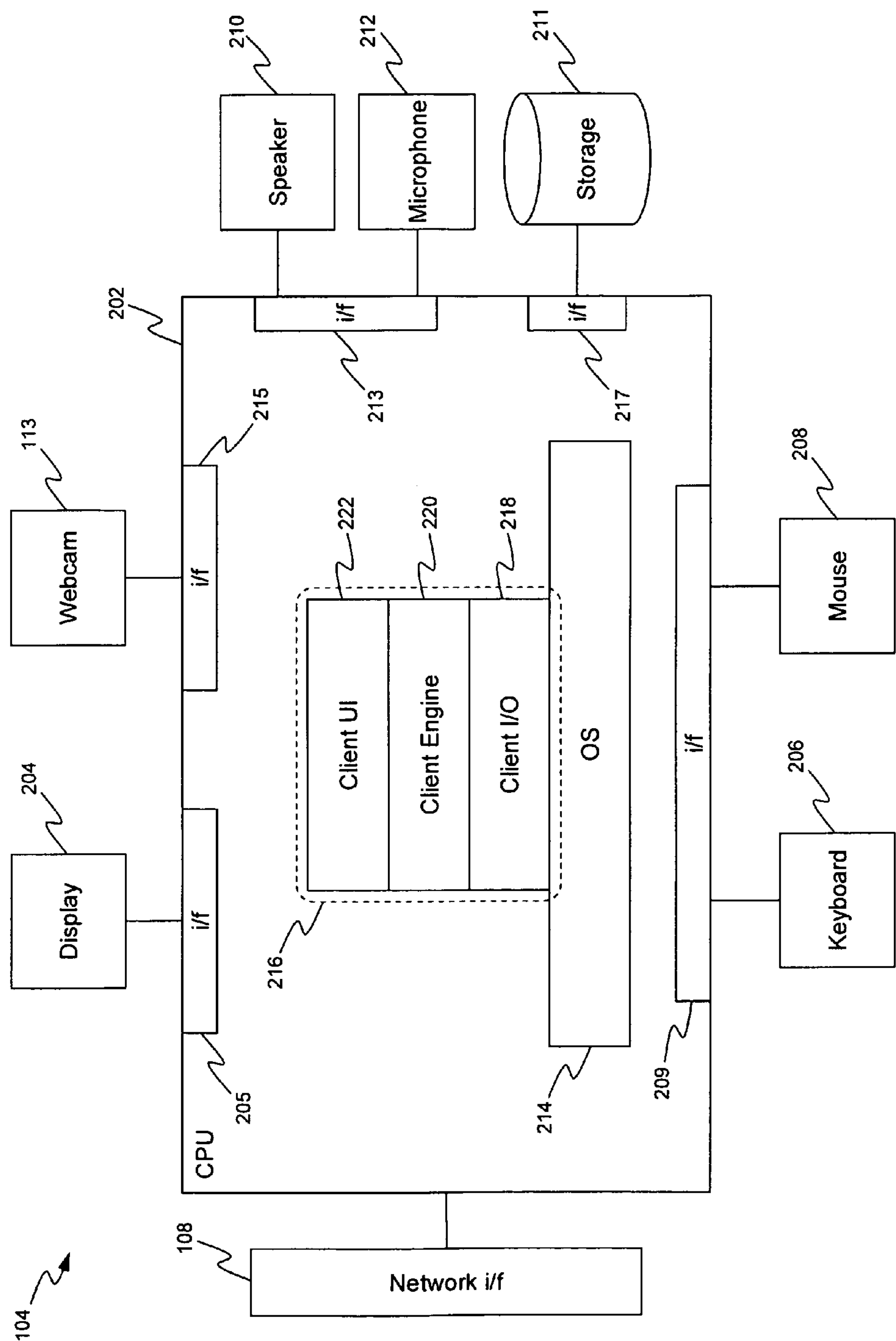
FIG. 2 shows the structure of a user terminal in the packet-based communication system.

FIG. 2 illustrates a detailed view of the user terminal 104 on which is executed client 110. The user terminal 104 comprises a central processing unit ("CPU") 202, to which is connected a display 204 such as a screen via a display interface 205, an input device such as a keyboard 206 and a pointing device such as a mouse 208 connected via an interface 209 such as USB. In alternative terminals, the input devices and pointing device can be integrated into the terminal, such as a keypad, touch-screen and/or joystick. An output audio device 210 (e.g. a speaker) and an input audio device 212 (e.g. a microphone) are connected via an audio interface 213. The output audio device 210 and input audio device 212 may be integrated into a handset 112 or headset, or may be separate. The CPU 202 is connected to the network interface 108. The CPU 202 is also connected to the webcam 113 via interface 215, for use in video calls.

The CPU is also connected to a storage device 211 via a storage interface 217. The storage device 211 can be a hard-disk drive or solid state memory. The storage device 211 can be used to store data that is related to the communication client 110.

FIG. 2 also illustrates an operating system ("OS") 214 executed on the CPU 202. Running on top of the OS 214 is a software stack 216 for the client 110. The software stack shows a client I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 108. With reference to the TCP/IP model, the operating system implements the transport, internet, and (optionally) a portion of the link layer, with the remainder of the link layer being implemented in firmware at the user terminal 104. The communication client 110 operates at the application layer. The client I/O layer 218 of the client software communicates with the operating system 214 and handles voice and video coding and manages the signalling and data connections over the communication system. Higher level functionality is provided by the client engine layer 220, including, for example, handling presence, relaying, user address look-up and authentication. The client engine 220 also communicates with the client user interface layer 222. The client engine 220 may be arranged to control the client user interface layer 222 to present information to the user via the user interface of the client (as shown in FIG. 2) and to receive information from the user via the user interface.

Figure 3:
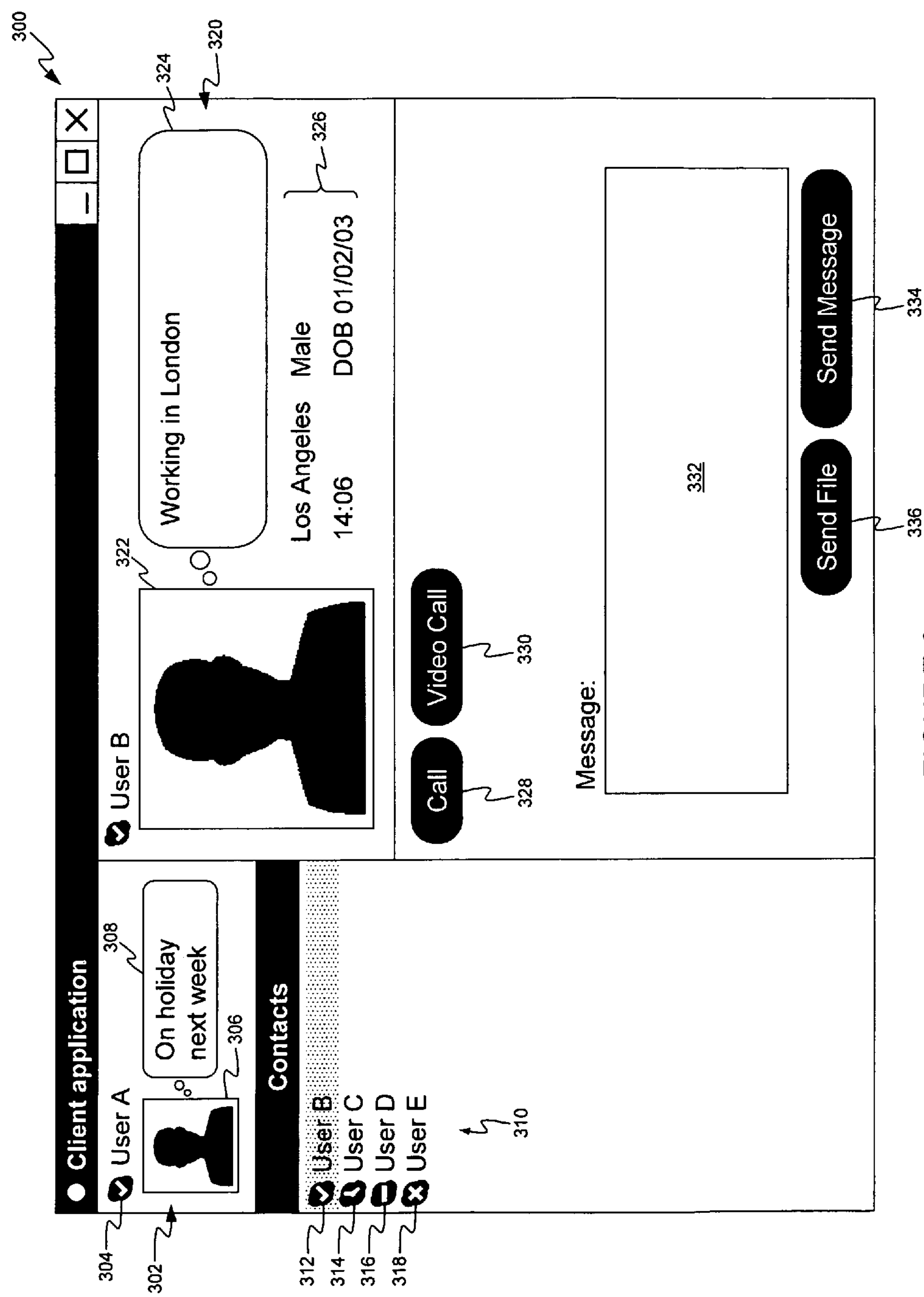
FIG. 3 shows a user interface of a communication client in the packet-based communication system.

An example of a user interface 300 of the communication client 110 executed on the user terminal 104 of the first user 102 is shown illustrated in FIG. 3. Note that the user interface 300 can be different depending on the type of user terminal 104. For example, the user interface can be smaller or display information differently on a mobile device, due to the small screen size. In the example of FIG. 3, the client user interface 300 displays user information 302 for "User A" 102 in the communication system. This shows the user-defined presence state icon 304 (that will be seen by other users), the user's avatar 306 and mood message 308.

The client user interface 300 comprises a contact list 310 showing the contacts stored by the user 102. In the example user interface in FIG. 3, four contacts of other users of the communication system are shown listed in contact list 310. Each contact in the contact list has a name and a presence state chosen by the contact associated with it, and each of these contacts have authorised the user of the client to view their contact details and the contact-defined presence information. For example, the presence status icon for "User B" 312 indicates that this contact is "online", the presence icon for "User C" 314 indicates that this contact is "away", the presence icon for "User D" 316 indicates that this contact's state is "do not disturb" ("DND"), the presence icon for "User E" 318 indicates that this contact is "offline". Further presence state indications can also be included.

When a contact in the contact list 310 is selected (for example "User B"), then corresponding profile information 320 is displayed for this contact. The profile information includes, for example, the contact's avatar 322, mood message 324 and personal details 326.

VoIP calls to the selected user in the contact list 310 can be initiated over the communication system by selecting the contact and clicking on a "call" button 328 using a pointing device such as a mouse. Similarly, a video call can be initiated by selecting the contact and clicking on a "video call" button 330. In addition to making real-time calls (voice or video), the user of the client 110 can also communicate with the users listed in the contact list 310 in several other ways. For example, the user 102 can type an IM message in the message field 332, and send the IM message to the selected contact using the "send message" button 334. Furthermore, the user 102 can use the client 110 to transmit documents or files to users in the contact list 310, by selecting a contact and clicking on the "send file" button 336.

The process for establishing a connection between user terminals is similar for each of the above-mentioned types of communication (i.e. calls, messages or file transfer). The connection set-up is performed using proprietary protocols, and is established over the network 106 between the calling user and called user by the peer-to-peer system without the use of central servers.

Described below is an illustrative example of the communication process in which the initiating user "User A" 102 establishes a connection with a second user "User B" 114.

After looking-up the network address of the called user terminal in a distributed P2P database, and following authentication through the presentation of digital certificates (to prove that the users are genuine subscribers of the communication system—described in more detail in WO 2005/009019), the connection between the users can be established. The client 110 performs the encoding and packetisation of data. Data packets from the user terminal 104 are transmitted into the network 106, and routed to a user terminal 116 of the called party 114, via a network interface 118. A client 120 (similar to the client 110) running on the user terminal 116 of the called user 114 decodes the packets to extract the data.

For example, in the case of a VoIP call, the packets are decoded to an audio signal that can be heard by the called user using the handset 122. Packets in a video call are decoded to produce both audio signals and video signals for display on the user terminal 116. For a file transfer, the data from the packets is reassembled to form the original file.

Conversely, when the second user 114 produces data (e.g. by talking into handset 122, capturing video data with webcam 123, or sending a file), the client 120 executed on user terminal 116 encodes the data into packets and transmits them across the network 106 to the user terminal 104. The client 110 executed on user terminal 104 decodes the packets, and extracts the data (as, e.g., an audio signal, video signal or file).

Due to the P2P nature of the system illustrated in FIG. 1, the actual connections between users of the communication system can be made with no central servers being used. This has the advantages that the network scales easily and maintains a high quality (i.e. high voice/video quality, throughput etc.), and the communication can be offered free to the users.

As stated, the file transfer functionality provided by the communication client 110 is utilised by users to share data files such as, for example, pictures, documents, audio files or movie clips. However, the file transfer functionality requires that both the sender and recipient of the data file need to be online at the same time in order to exchange the file. This is because a connection between the user terminals needs to be established as outlined above. This is problematic as the sender must wait for the recipient to be online before sending the file, and both parties must stay online until the transfer is completed. As file transfer is not inherently an interactive service (in the way that, for example, voice or video calling is) this reduces the utility of the file transfer functionality.

One method of enabling users to exchange files when they are not both simultaneously online would be to implement a centralised server with the capability to store a file sent from a user terminal, and hold it until the recipient user terminal comes online and retrieves it. However, such a technique is not scalable, and the amount of storage and bandwidth capacity that would be required for such a server in a system having several million users is not readily achievable in practice.

Figure 4B:
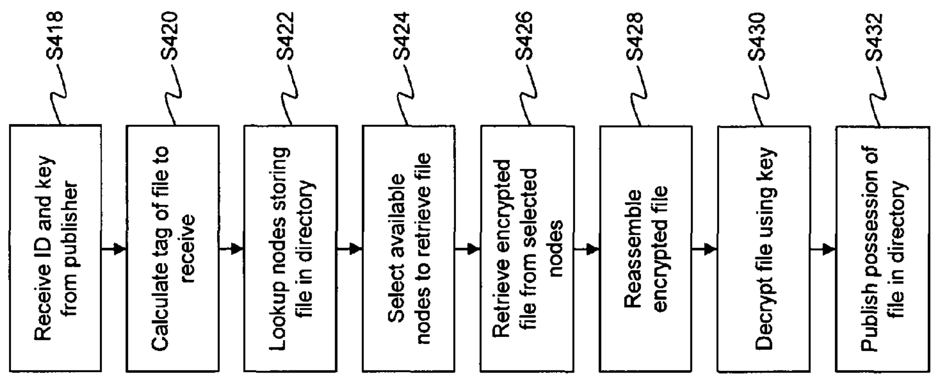
FIG. 4B shows a flowchart of a process for receiving data.
Figure 4A:
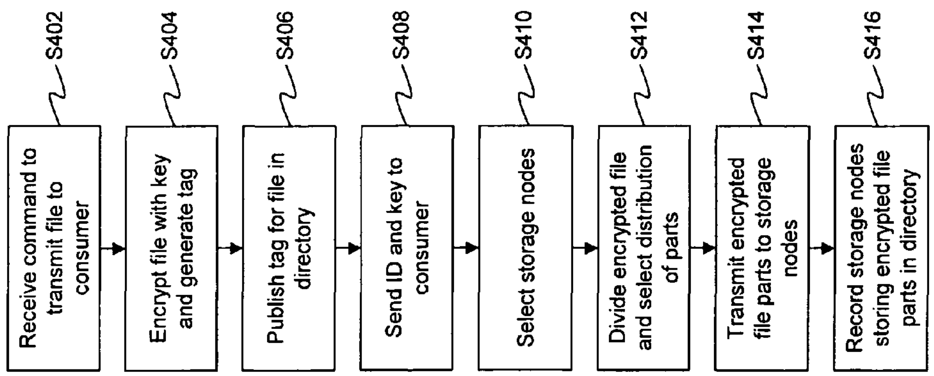
FIG. 4A shows a flowchart of a process for transmitting data.
Figure 5:
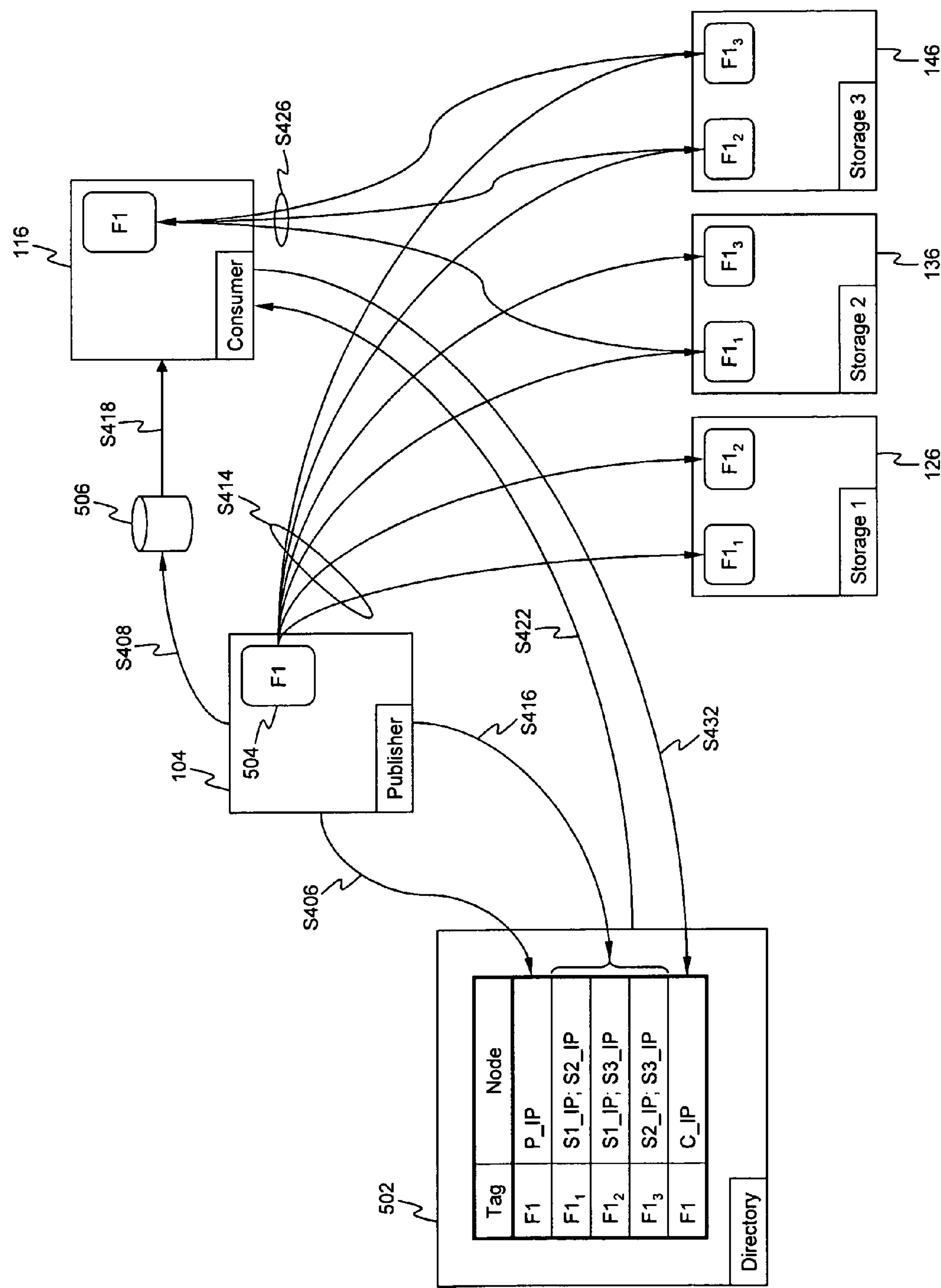
FIG. 5 shows the exchange of messages between entities in an offline file transfer.

Reference is now made to FIGS. 4A, 4B and 5, which illustrate a technique for enabling file transfers to be performed over the packet-based communication system without requiring both users to be connected simultaneously.

Referring first to FIG. 4A, a flowchart of a process for transmitting a file from a sender user terminal is illustrated. In this example, User A 102 is sending a file to User B 114. The user terminal 104 of User A 102 is called the "publisher" user terminal, and the user terminal 116 of User B 114 is called the "consumer" user terminal. In the following, it is assumed that a direct connection between the publisher user terminal 104 and the consumer user terminal 116 is not possible, due to them not being connected to the packet-based communication network at the same time. If the two user terminals (104, 116) were connected at the same time, then a direct connection is preferable, as it provides the lowest latency and highest throughput.

In step S402 in FIG. 4A, the communication client application 110 executed on the publisher user terminal 104 receives a command to transmit the data file to the consumer user terminal 116. The command to transmit the data file to the consumer user terminal can originate from a number of sources. This can originate from the user 102 selecting to initiate communication using the communication client 110 user interface (as shown in FIG. 3), for example by selecting the file transfer buttons 336. The command can also originate from the user 102 operating a hardware device connected to the user terminal 104. Alternatively, the command can originate from another module within the communication client software 110, or from another application executed on the operating system 214 of the user terminal 104. Furthermore, the command can originate from outside the user terminal 104, and be communicated to the user terminal 104 via the network 106.

The data file that is to be sent by the publisher has a unique identifier embedded with the content of the data file. This is an identifier which uniquely identifies the content of the data file (amongst all the other data files that are sent over the packet-based communication network). By maintaining the integrity of the identifier throughout all subsequent publications of the data stream, the content of the data file can be readily identified. Therefore, it can be readily determined whether a data file comprises the same or different content from another data file.

Preferably, the data file ID is created by using a hash algorithm on the content of the data file. This allows an identifier to be created without needing knowledge of any other existing files or needing to communicate with any additional network entities. Alternatively, the stream ID can be determined by obtaining an identity from a list of available file identities. Such a list can take the form of a centralised database or a distributed database.

In step S404, the publisher 104 encrypts the data file (including both the content and the data file ID) using an encryption key. Therefore, the content and the data file ID will now only be able to be read by user terminals that know the encryption key, and can therefore decrypt the data file.

Furthermore, in step S404, the publisher 104 generates a further identifier called a tag. The tag is distinct from the data file ID. The tag is used to uniquely identify the particular instance of publication of the data file, and not the content of the data file itself (which is achieved by the data file ID). Therefore, the publication and the content of the data file can be separately identified using the tag and the data file ID.

The data file ID is not derivable from the tag. Preferably, the tag is generated by the publisher using a one-way function such as a hash function. This ensures that the data file ID cannot be derived or recreated from the tag. Furthermore, because the data file ID is a unique identifier, the tag generated from the data file ID is also a unique identifier.

The hash function can also include further arguments. Preferably, the encryption key is used as an input to the hash function as well as the data file ID. This ensures that when a data file is republished, a tag is generated that is different to other tags used at other instances of publication. Every time that the data stream is republished by a new publisher, it is encrypted with a different encryption key. Therefore, by generating the tag using a hash of the data file ID and the encryption key, a different tag is generated at each republication.

In alternative embodiments, the tag can be generated using other methods, not based on the data file ID or encryption key, for example generating a random tag value. The tag is added to the encrypted data stream. It is important to note that the tag remains unencrypted (i.e. can be read by any node) and the data file ID and content are encrypted (i.e. can only be read by nodes possessing the encryption key). Unencrypted data such as the tag is called plaintext or clear data.

In step S406, the publisher user terminal 104 sends the tag for the data file to a directory database 502, as shown in FIG. 5. In the example in FIG. 5, the data file 504 has a tag "F1", and this is stored in the directory database 502 along with a network identifier for the publisher user terminal 104, such as the IP address of the publisher user terminal 104 ("P_IP" in FIG. 5).

The directory database 502 is a database that can be accessed by any node in the packet-based communication system, and is used to record which nodes have possession of data files having particular tags. Because only the tag is recorded in the directory database 502, and not the data file ID, the privacy of the users is maintained, as someone reading the information in the directory can only ascertain that a certain node has possession of a data file having a certain tag. As stated, the tag cannot be used to derive the data file ID, and hence the actual content of the data file cannot be determined from the information in the directory.

The directory database 502 can be implemented on a centralised server that is accessible to all users of the packet-based communication system. This is achievable in practice as the amount of data that needs to be stored is very small. Alternatively, the directory database 502 can be implemented as a distributed peer-to-peer database, which appears to a user as identical in functionality to a centralised database, but the data is distributed over a plurality of end user terminals in the in the packet-based communication system that are acting as administrative nodes.

In step S408, the publisher user terminal 104 sends a notification message to the consumer user terminal 116 comprising the data file ID and the encryption key. This message is sent over a secure channel, as it comprises sensitive information, which only the consumer user terminal 116 should be aware of.

However, in this example, the publisher user terminal 104 and the consumer user terminal 116 are not online at the same time, and hence a direct communication between them is not possible. Therefore, a communication channel is required that enables the publisher user terminal 104 to send the message regardless of the status of the consumer user terminal 116, and for the consumer user terminal 116 to retrieve the message regardless of the status of the publisher user terminal 104.

Such channels already exist in packet-based communication networks, and are used to notify a user coming online of events that have occurred whist they were not connected, for example as described in WO2007/059796. For example, such a channel is used to notify a user that a voicemail message has been left for them. These channels use a message server to store the message, such that the recipient of the message can download it when they connect to the packet-based communication network. Because the amount of data is very small for the data file ID and the encryption key, this does not place significant demands on the server in terms of required storage and bandwidth. The data file ID and encryption key are shown being stored at a storage element 506 in FIG. 5.

In step S410, the publisher user terminal 104 selects one or more end-user terminals in the packet-based communication system to act as storage nodes. The selected storages nodes are used to store the data file before it is retrieved by the consumer user terminal 116. By using end-user terminals as storage nodes, the problems with storing data files on a central server are avoided. In particular, due to the very large number of end-user terminals that can be used as storage nodes, a large amount of overall storage capacity is available, without any individual user terminal needing to store a large amount of data. In addition, the bandwidth requirements are spread out over all the end-user nodes, meaning that a very high bandwidth is not needed in at a single server to serve all the requests.

The end-user terminals can be selected to act as storage nodes by the publisher user terminal 104 by analysing the available resources at candidate storage nodes. For example, the publisher user terminal 104 can compile a list of candidate storage nodes based on a factor such as favourable firewall conditions. In other words, only end-user terminals that can be readily accessed by the publisher and consumer are selected as candidate storage nodes.

In alternative embodiments, the process of selecting the storage nodes can be aided by other end-user terminals acting as administrative nodes in the packet-based communication network. These administrative nodes can maintain the list of candidate storage nodes from which the publisher can select the storage nodes.

Preferably, the storage nodes selected from the candidate storage nodes can then be chosen on the basis of resources such as available storage capacity and available bandwidth. A limit can be set on the amount of storage that can be used on end-user terminals acting as storage nodes. This ensures that excessive resources are not used at an end-user node for the purposes of another users file transfer. Therefore, an end-user terminal already storing data is not selected to store more data if other end-user terminals are available with more storage resources.

Alternatively, the publisher user terminal 104 can simply perform a random selection of the storage nodes from the candidate storage nodes.

The number of storage nodes that is selected by the publisher is based on the size of the file being transmitted. A large file is split up between storage nodes (as described below) in order to prevent too much data being stored on the end-user terminals acting as storage nodes, and placing excessive bandwidth requirements on these nodes.

In step S412, the encrypted data file is divided into a number of parts or portions. The number of parts into which to divide the data file depends upon the number of storage nodes that are needed to store the file, and also the amount of redundancy that is required to ensure that the complete file can be obtained later by the consumer 116. Because the data is stored on end-user terminals, the publisher 104 cannot guarantee that the storage nodes will be online at the point when the data file is to be retrieved by the consumer 116. Therefore, the data file should be replicated between the storage nodes in order to provide redundancy.

This is illustrated with reference to FIG. 5. In this example, the data file F1 to be sent has a size that requires it to be divided among three storage nodes. User terminals 126, 136 and 146 (from FIG. 1) are selected to be the storage nodes. The data file F1 is divided into three parts: $F1_1$; $F1_2$; and $F1_3$.

If each of the three storage nodes (126, 136, 146) was sent and stored one of these parts, then if any one of these storage nodes (126, 136, 146) was not online when the data file was required, then it would not be possible to obtain the entire data file F1 from them. This can be solved by replicating the parts of the data file amongst the storage nodes. This is illustrated in FIG. 5, where storage node 126 stores $F1_1$ and $F1_2$, storage node 136 stores $F1_1$ and $F1_3$, and storage node 146 stores $F1_2$ and $F1_3$. Therefore, even if one of the three storage nodes in FIG. 5 was not online, then each of the parts of the data file can be accessed.

The more replication that is allowed, the greater the likelihood of being able to obtain the full data file, as the a larger proportion of the storage nodes can be offline but still enable each part of the data file to be accessible. However, a larger degree of replication places a higher storage requirement on the storage nodes, as more data needs to be stored. This has the consequence that more storage nodes are needed and the data needs to be divided more, in order to require less storage per part of the data file.

The division of the data file between several storage nodes has a further advantage that no one single storage node has access to the whole data file. This therefore provides an additional security and privacy level on top of the encryption of the data file.

In addition, more advanced redundancy schemes can be used to divide up the data between the storage nodes. For example, a parity scheme can be used where the data is split into, say, three blocks, each half the size of the data. The three blocks are then stored over three storage nodes. To retrieve the data, the consumer user terminal needs any two of the three blocks to fully receive the data. Other advanced algorithms, such as Reed-Solomon codes are also known for use in providing redundancy and can be employed here.

In step S414, the publisher user terminal 104 sends the divided parts of the encrypted data file to the respective selected storage nodes. The different parts of the encrypted data file are then stored at the respective selected storage nodes, as shown in FIG. 5.

In step S416, the publisher user terminal 104 records in the directory database the network identity (such as the IP address) of each of the storage nodes storing each portion of the data file.

At this point, the transmission of the file from the publisher user terminal 104 is complete. The publisher user terminal 104 can now disconnect from the packet-based communication network and go offline if desired.

Reference is now made to FIG. 4B, which illustrates a flowchart for the process of receiving the data file at the consumer user terminal 116.

In step S418, the consumer user terminal 116 connects to the packet-based communication network, and receives the notification message sent by the publisher user terminal 104 and held at the storage element 506. The notification message indicates that the publisher user terminal 104 wishes to transmit a file to the consumer user terminal 116. The notification message contains the data file ID and encryption key for the data file.

In step S420, using the data file ID and the encryption key, the consumer user terminal 116 can calculate the tag for the data file. For example, this can be done by using the hash algorithm discussed hereinbefore having the data file ID and the encryption key as inputs. In alternative embodiments, the tag can be sent with the data file ID and encryption key, but calculating the tag has the advantage that storage is saved at the storage element by not sending the tag as well.

In step S422, the consumer user terminal 116 accesses the directory database 502 and retrieves the information regarding the nodes that are storing the data file having the tag calculated in step S420. This therefore results in the consumer user terminal obtaining the network identity (e.g. IP address) of the publisher user terminal 104 (which was written to the database 502 in S406) and each of the storage nodes (e.g. 126, 136, 146 in FIG. 5).

The consumer user terminal 116 can then, in step S424, determine which of these user terminals are available to obtain the data file from. As stated above, it is assumed that the publisher user terminal 104 is offline, and therefore the data file cannot be obtained from the publisher. The consumer user terminal 116 therefore determines which storage nodes are available, and whether the complete data file can be obtained from them.

For example, referring to FIG. 5, the consumer user terminal 116 can determine that storage node 126 is not available, but storage nodes 136 and 146 are available. From the information obtained from the directory database 502, the consumer user terminal 116 can determine the complete data file can be obtained from the two available storage nodes.

In step S426, the consumer user terminal 116 retrieves the encrypted portions of the data file from the available storage nodes. For example, in FIG. 5, the consumer user terminal retrieves portion $F1_1$ from storage node 136 and portions $F1_2$ and $F1_3$ from storage node 146.

Once all the portions of the data file have been retrieved from the storage nodes, they can be reassembled in step S428 into a complete, encrypted data file. In step S430, the encrypted data file can be decrypted using the encryption key provided in step S418. Therefore, the consumer user terminal 116 has obtained a complete, decrypted copy of the data file sent by the publisher user terminal 104.

The final step, in S432, is for the consumer user terminal 116 to update the directory database to indicate that it now has possession of the data file. This is done by storing the network identity (e.g. IP address) for the consumer user terminal 116 in association with the tag for the data file. This enables the publisher user terminal 104 to access the directory when it comes online again, and determine whether the consumer user terminal 116 has obtained the transferred data file by looking for the network identity of the consumer user terminal against the tag.

This also has the further advantage that if the same file was being transferred to other additional consumer user terminals by the publisher 104 as well, then these additional consumer user terminals can determine that the data file is present at the consumer user terminal 116, and retrieve it from there instead of obtaining it from storage nodes.

Therefore, the processes described with reference to FIG. 4A (for transmitting the data' file) and FIG. 4B (for receiving the data file) allow data files to be transferred between users of the packet-based communication system without requiring them to be connected and online at the same time, and without requiring significant storage or bandwidth use at a centralised server.

While this invention has been particularly shown and described with reference to preferred embodiments, it will be understood to those skilled in the art that various changes in form and detail may be made without departing from the scope of the invention as defined by the appendant claims.

For example, the data file being transferred can be a document, image file, audio file, video file which is not directly created by the communication client used by the publisher for accessing the packet-based communication system. Alternatively, the data file can be created by the communication client of the publisher itself, such as voicemail message. Furthermore, the publisher and recipient can be the same node. For example, a user can create a file and send it using the technique above such that it is held on the storage nodes (thus becoming the publisher). The user can then delete the original file from the user terminal, but subsequently retrieve it from the storage nodes (thus becoming the recipient).

In an alternative embodiment, the step of transmitting the data file ID to the consumer user terminal 116 from the publisher user terminal 104 (S408 and S418 in FIG. 5) can be omitted if the data file ID can be derived autonomously by the consumer user terminal 116. For example, the data file ID can be created by the publisher user terminal 104 as a combination of the publisher's username, the consumer's username and a sequence number. Each time the client of the consumer user terminal 116 connects to the packet-based communication system, it can check the directory database 502 for the existence of data file IDs combined from a contact's username, its own username and the last sequence number received from this contact. This can be performed for each contact in the contact list of the consumer user terminal 116. In this way, if any data files have been sent to the consumer user terminal from one of its contacts, then this can be determined from the directory database, and then retrieved as outlined above.

In further alternative embodiments, the directory database 502 can be omitted if the information stored is passed to the consumer user terminal 116 via an alternative mechanism. For example, the list of storage nodes storing the data file can be provided to the consumer user terminal 116 as part of the notification message sent to the consumer user terminal 116 by the publisher user terminal 104.

In yet further alternative embodiments, the encryption key need not be sent to the consumer user terminal 116 in the notification message. For example, the encryption key can be agreed in advance between the publisher and consumer user terminals, and used for data files sent between these nodes. Alternatively, a public key infrastructure can be used, i.e. the publisher user terminal encrypts the data file with the consumer user terminal's public key.

In accordance with one aspect of the invention there is provided a computer programme product comprising programme code means which, when executed by a computer, implement a method of transmitting data in a network of interconnectable end-user nodes comprising a source node, a recipient node and a plurality of further nodes, wherein each of the end-user nodes is executing an instance of a communication client application, the method comprising:

- the communication client application of the source node receiving a command to transmit the data to the recipient node;
- the source node selecting from the plurality of further nodes at least one storage node to store the data from the source node before being retrieved by the recipient node;
- transmitting the data from the source node to the at least one storage node; and the source node providing a network identity for each of the at least one storage nodes to the recipient node.

In accordance with one aspect of the invention in certain embodiments there is provided a user terminal connected to a network of interconnectable end-user nodes comprising a recipient node and a plurality of further nodes, wherein the user terminal and each of the end-user nodes is arranged to execute an instance of a communication client application, and the communication client application of the user terminal is configured to receive a command to transmit the data to the recipient node; select from the plurality of further nodes at least one storage node to store the data from the source node before being retrieved by the recipient node; transmit the data from the source node to the at least one storage node; and provide a network identity for each of the at least one storage nodes to the recipient node.

The user terminal may have the following features.

The at least one storage node may not read the content of data.

The recipient node and the plurality of further nodes may be mutually exclusive.

The communication client application of the user terminal may be further configured to encrypt the data using an encryption key prior to transmitting the data to the at least one storage node.

The communication client application of the user terminal may be further configured to transmit a notification message comprising a data identifier to the recipient node.

The notification message may further comprise the encryption key.

The communication client application of the user equipment may be configured to derive a further identity for the data from the data identifier.

The communication client application of the user terminal may be further configured to provide the further identity for the data to the recipient node in association with the network identity.

The further identity may be generated by the user terminal using a function having the data identifier as a first input.

The function may further have the encryption key as a second input.

The function may be a one-way function, such that the data identifier cannot be derived from the further identity.

The one-way function may be a hash function.

The communication client application of the user terminal may be configured to provide the network identity for each of the at least one storage nodes to the recipient node by storing the network identity for each of the at least one storage nodes in a database that is accessible by the recipient node.

The communication client application of the user terminal may be configured to determine available resources of the plurality of further nodes and select the at least one storage node in dependence on the available resources.

In the case that the user terminal selects a plurality of storage nodes, the communication client application of the user terminal may be configured to generate a plurality of data blocks from the data, and transmit at least one block of the data to each of the plurality of storage nodes.

The communication client application of the user terminal may be further configured to provide to the recipient node an indication of which block of the data each of the plurality of storage nodes has stored.

The communication client application of the user terminal may be further configured to store a network identity for the user terminal in the database.

The network of interconnectable end-user nodes may be an overlay network operating on the internet.

The overlay network may be peer-to-peer overlay network.

In accordance with another aspect of the invention in certain embodiments there is provided a user terminal connected to a network of interconnectable end-user nodes comprising a source node and a plurality of further nodes, wherein the user terminal and each of the end-user nodes is arranged to execute an instance of a communication client application, and the communication client of the user terminal is configured to determine that data from the source node is awaiting retrieval; derive at least one network identity for at least one further node acting as a storage node for the data; determine whether the data can be retrieved from the at least one storage node; establish a connection with one or more of the at least one storage nodes and retrieve the data. The user terminal may have the follow features:

The communication client of the user terminal may be configured to determine that data from the source node is awaiting retrieval by receiving a notification message indicating that data from the source node is awaiting retrieval, the notification message comprising a data identifier;

The notification message may comprise an encryption key.

The communication client of the user terminal may be further configured to decrypt the retrieved data using the encryption key.

The communication client of the user terminal may be further configured to access a database and use the data identifier to determine at least one network identity for at least one further node acting as a storage node.

The communication client of the user terminal is further configured to calculate a further identity for the data from the data identifier, and search for database entries associated with the further identity.

The further identity may be calculated using a function having the data identifier as a first input.

The function may further have the encryption key as a second input.

The function may be a one-way function, such that the data identifier cannot be derived from the further identity.

The one-way function may be a hash function.

The communication client of the user terminal may be configured to determine whether the data can be retrieved from the at least one storage node by analysing the availability of each of the at least one storage nodes.

The communication client of the user terminal may be further configured to determine that the data is stored as a plurality of blocks, and determine which of the at least one storage node stores each of the plurality of blocks.

The communication client of the user terminal may be configured to establish a connection with one or more of the at least one storage nodes by selecting the one or more of the at least one storage nodes such that a sufficient number of the blocks are retrieved by the user terminal to reconstitute the data.

The communication client of the user terminal may be further configured to store a network identity for the user terminal in the database responsive to retrieving the data.

The network of interconnectable end-user nodes may be an overlay network operating on the internet.

The overlay network may be a peer-to-peer overlay network.

The invention claimed is:

1. A method comprising:

receiving at a source node a command to transmit a data file to a recipient node via a network of a plurality of nodes comprising a plurality of end-user terminals, the data file comprising content and a data file identifier (ID);

selecting from the plurality of nodes at least one storage node to store the data file before the data file is retrieved by the recipient node, the at least one storage node comprising one or more of the plurality of end-user terminals in the network;

transmitting the data file from the source node to the at least one storage node; and providing the data file ID and a network identity for the at least one storage node to the recipient node to enable the recipient node to subsequently retrieve the content of the data file from the at least one storage node.

2. A method according to claim 1, wherein the at least one storage node does not read the content of the data.

3. A method according to claim 1, wherein the recipient node and the plurality of nodes are mutually exclusive.

4. A method according to claim 1, further comprising encrypting the data file using an encryption key prior to transmitting the data file to the at least one storage node.

5. A method according to claim 4, further comprising transmitting a notification message that includes the data file ID from the source node to the recipient node.

6. A method according to claim 5, wherein the notification message further comprises an encryption key.

7. A method according to claim 6, further comprising deriving an additional identity for the data file from the data file ID.

8. A method according to claim 7, further comprising providing the additional identity for the data file to the recipient node in association with the network identity.

9. A method according to claim 7, wherein the additional identity is generated by the source node using a function having the data file ID as a first input.

10. A method according to claim 9, wherein the function further has the encryption key as a second input.

11. A method according to claim 9, wherein the function is a one-way function, such that the data file ID cannot be derived from the additional identity.

12. A method according to claim 11, wherein the one-way function is a hash function.

13. A method according to claim 1, wherein the providing of the data file ID and the network identity for the at least one storage node comprises storing the data file ID and the network identity in a database that is accessible by the recipient node.

14. A method according to claim 1, wherein the selecting of the at least one storage node comprises: determining available resources at the plurality of nodes and selecting the at least one storage node based on the available resources.

15. A method according to claim 1, further comprising, in an event that plurality of storage nodes are selected, generating a plurality of data blocks from the data file, and wherein the transmitting of the data file comprises transmitting at least one block of the data file to each of the plurality of storage nodes.

16. A method according to claim 15, wherein the method further comprises providing to the recipient node an indication of which block of the data file each of the plurality of storage nodes has stored.

17. A method according to claim 13, further comprising causing a network identity for the source node to be stored in the database.

18. A method according to claim 1, wherein the network of the plurality of nodes is an overlay network operating on the internet.

19. A method according to claim 18, wherein the overlay network is a peer-to-peer overlay network.

20. A hardware computer program product comprising code means which, when executed by a computer, implement a method comprising:

receiving at a source node a command to transmit data to a recipient node, the source node and the recipient node both being part of a peer-to-peer network of a plurality of end-user nodes;

selecting from the plurality of end-user nodes at least one storage node to store the data from the source node before being retrieved by the recipient node;

transmitting the data from the source node to the at least one storage node; and providing a network identity for the at least one storage node to the recipient node to enable the recipient node to retrieve the data from the at least one storage node.

21. A user terminal comprising:

a communication client application that is executable by the user terminal, the user terminal being connectable to a network of interconnectable end-user nodes comprising a recipient node and a plurality of nodes, the communication client application of the user terminal being configured to:

receive a command to transmit data to the recipient node;

select from the plurality of nodes at least one storage node to store the data from the source node before the data is retrieved by the recipient node;

transmit the data from the source node to the at least one storage node; and provide a network identity for the at least one storage node to the recipient node to enable the recipient node to retrieve the data from the storage node.

* * * * *